June 21, 1932.  O. S. PETTY  1,864,214
INSTRUMENT FOR DETECTING VIBRATIONS
Filed March 27, 1928  2 Sheets-Sheet 1

INVENTOR
OLIVE SCOTT PETTY
BY
ATTORNEY

June 21, 1932.  O. S. PETTY  1,864,214
INSTRUMENT FOR DETECTING VIBRATIONS
Filed March 27, 1928  2 Sheets-Sheet 2
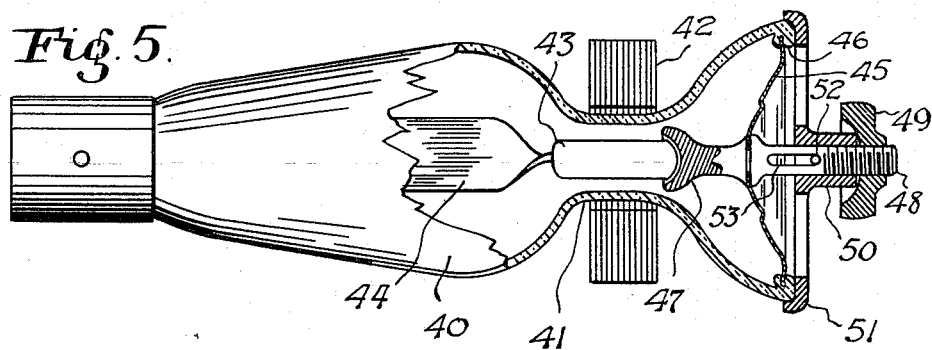
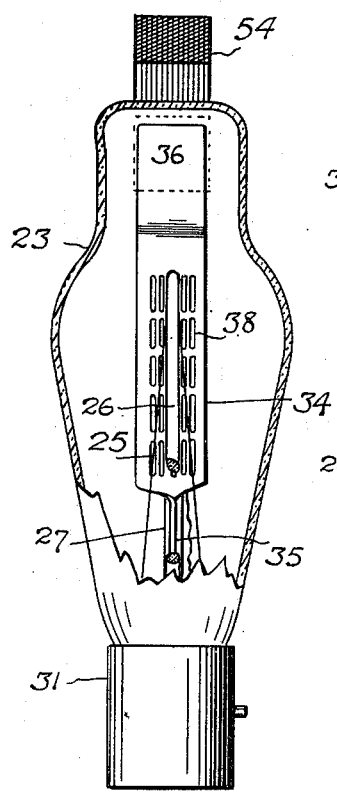
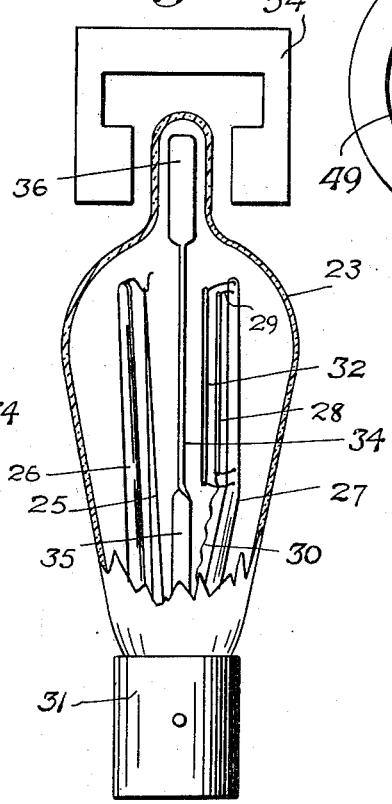
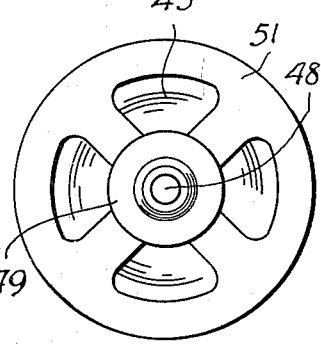
INVENTOR
*OLIVE SCOTT PETTY.*
BY
ATTORNEY Patented June 21, 1932

1,864,214

UNITED STATES PATENT OFFICE

OLIVE SCOTT PETTY, OF SAN ANTONIO, TEXAS

INSTRUMENT FOR DETECTING VIBRATIONS

Application filed March 27, 1928. Serial No. 265,068.

This invention relates to an instrument for use as a seismograph or for detecting, observing, indicating or recording mechanical or elastic vibrations or motions and although the device may be utilized for recording distant earthquakes or for recording or detecting vibrations in bridges, buildings and other structures or the vibrations in machinery and the like, it is specially adapted for use in applied geophysics more particularly to detect or record sound waves produced in the earth and air by the detonation of charges of explosives for the purpose of obtaining data or records which may be studied with a view to determining underlying geological formations.

One object of my invention is to provide an improved instrument of small compact and conveniently portable form for use in transforming mechanical or elastic vibrations or motions into fluctuating electric currents for the purpose of observing, indicating, detecting or recording vibrations or motions.

A further object of this invention is to provide an instrument of the character above described in which a pendulum steady mass is enclosed within and is constructed as an element or a part of an element of a two or three element thermionic vacuum tube.

With these and other objects in view the invention consists in the novel construction and arrangement of parts hereinafter described, illustrated in the accompanying drawings, and particularly pointed out in the appended claims, it being understood that various changes may be made without departing from the spirit or sacrificing any of the advantages of the invention.

Figure 1:
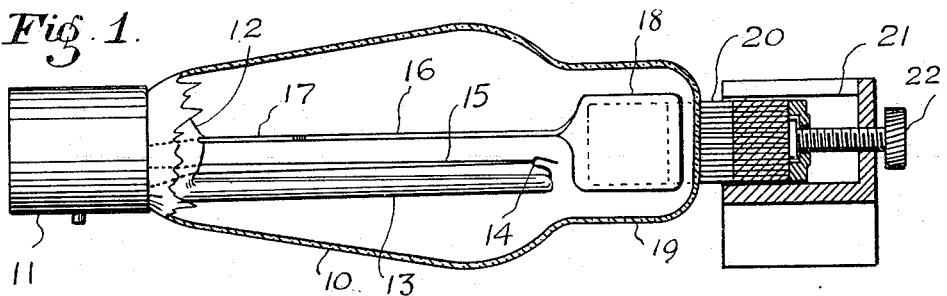
Figure 2:
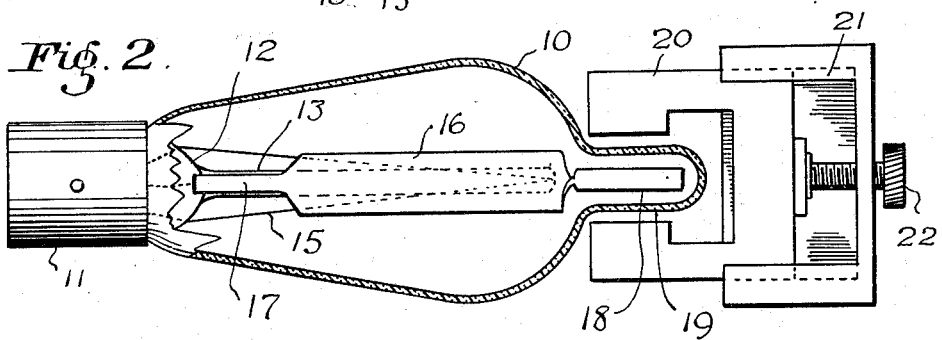
Figure 3:
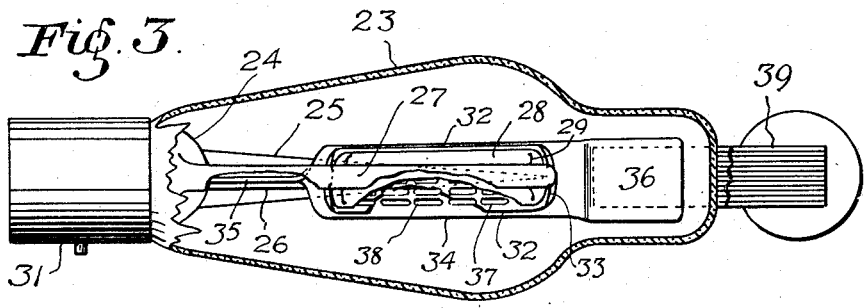
Figure 4:
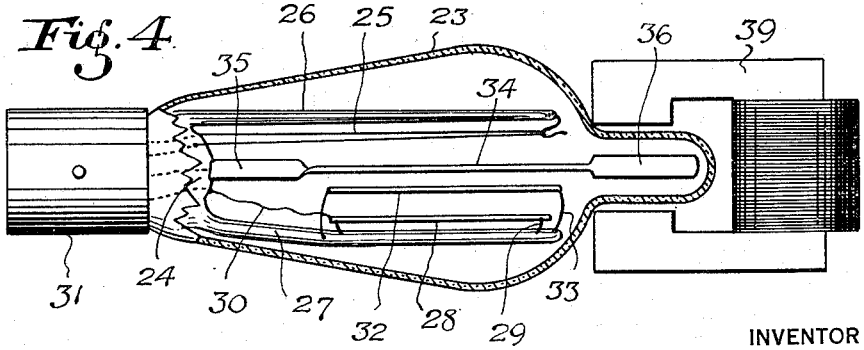

In the drawings: Fig. 1 is a side view and Fig. 2 is a plan view both partly in section showing one form of the device for detecting the vertical component of the motion; Figs. 3 and 4 are views corresponding to Figs. 1 and 2 respectively but showing a modified form; Fig. 5 is a view corresponding to Figs. 2 and 4 but showing another modified form; Fig. 6 is an end view of the same; and Figs. 7 and 8 are elevations looking at right angles to each other and both partly in section showing a form of the device suited for the detection of the horizontal component of the motion.

In the device shown at Figs. 1 and 2, for detecting the vertical components of motions a vacuum tube or casing 10 is formed with a plug 11 with the proper contacts (not shown) on the end thereof for engagement with the contacts in a suitable receiving socket. An internal stem part 12 is provided with a rod 13 having a hook 14 for supporting the filament 15, and extending from the stem 12 in spaced relation to the filament 15 is a plate 16 having a resilient portion 17 and a weighted portion 18 and adapted to serve as the pendulum or steady mass of the instrument, and as the plate 16 forms part of the steady mass and as the filament 15 moves with the other parts of the device, the distance between the plate and the filament varies and fluctuations are thus produced in an electric current flowing from the filament 15 to the plate 16 and such fluctuations are detected and observed, indicated or recorded in any suitable or well known manner and if so desired amplification may be readily effected by means of an ordinary vacuum tube amplifier. The weighted portion 18 is made of copper and is free to move in a flattened extension 19 formed on the end of the casing 10; and in order to properly damp the movements in accordance with the well known principles of seismograph construction a damping magnet 20 is mounted so as to embrace the portion 18. This magnet 20 is mounted in a guide 21 and has an adjusting screw 22 by means of which it may be shifted relatively to the path of portion 18 so that the magnetic damping effect may be conveniently modified to suit requirements.

In the device shown at Figs. 3 and 4 the invention is embodied in a three-element vacuum tube in which the casing 23 has a stem part 24 from which the filament, plate and grid of the tube are all properly supported. The filament 25 is suitably supported by the rod 26 while the rod 27 supports the plate 28 by means of the arms 29, and a lead 30 provides proper connection between the plate 28 and an appropriate contact (not shown) on the end of the plug 31. The grid of this tube comprises a member 32 carried by means of arms 33 from the aforesaid rod 27, and a relatively movable member 34 which has a flexible part 35 connecting it to the stem 24, has a weighted copper portion 36, and constitutes the pendulum or steady mass of the instrument. The part 32 is slotted or perforated at 37 and the part 34 is similarly slotted or perforated at 38 (see Fig. 3) so that relative movement between these parts 32, 34 results in a corresponding variation in the impedance in the vacuum tube and this variation is recorded or observed in any suitable or well known manner at any convenient location. In this form of the device the magnetic damping is effected by means of an electromagnet 39 which is energized from any suitable source and by which the damping effect may be readily varied as circumstances may require.

In the device shown at Figs. 5 and 6 the casing 40 has a flattened waist part 41 for the reception of a damping magnet 42 which embraces a copper weight 43 on the member 44 of the pendulum or steady mass and a metallic disc 45 is hermetically sealed in a mouth 46 at the end of the casing. In the position shown at Fig. 5, the atmospheric pressure on the exterior of the disc 45 holds a member 47 in position to prevent injury to the steady mass due to vibration or concussion in transit. The member 47 is hermetically sealed to the disc 45 and has an external extension 48 which is screw threaded at its outer end for the reception of a nut 49 which bears against a sleeve 50 on a skeleton cover 51 fitted on the end of the casing. Relative rotation of the parts 48 and 50 is prevented by means of a pin 52 extending through a slot 53 in the extension 48 and through holes in the sleeve 50, and rotation of the nut 49 relatively to the cover 51 withdraws the member 47 from engagement with the steady mass and permits the latter to function in the desired manner and as hereinbefore described.

Figs. 7 and 8 show a device adapted for the recording of the horizontal components of movements. The internal construction of this particular device is similar to that shown at Figs. 3 and 4 except that a permanent magnet 54 is illustrated instead of the electromagnet of Figs. 3 and 4, but it will, of course, be understood that any suitable form of damping means may be employed in either form of the device; and each form of the device above described may be readily adapted for use in detecting either the vertical or the horizontal component of the motions.

What I claim is:—

1. A seismograph comprising a thermionic vacuum tube with one element thereof serving as a pendulum steady mass movable in only one plane, and external means for damping relative movement of the tube and the steady mass.

2. A seismograph comprising a thermionic vacuum tube with one element thereof serving as a pendulum steady mass movable only in a single plane and magnetic damping means for said mass.

3. A seismograph comprising a thermionic vacuum tube with one element thereof serving as a pendulum steady mass movable only in one plane, and variable magnetic damping means for the steady mass.

4. A seismograph comprising a thermionic vacuum tube with one element thereof serving as a pendulum steady mass movable only in a single plane, and means within the tube for temporarily preventing the movement of the steady mass.

5. A seismograph consisting of a thermionic vacuum tube comprising a casing, an enclosed element fixed relatively to the casing, an enclosed element serving as a pendulum steady mass movable only in one plane, and external means for damping the relative movement of the said mass.

6. A seismograph consisting of a thermionic vacuum tube comprising a casing, an enclosed element fixed relatively to the casing, an enclosed element serving as a pendulum steady mass movable in only a single plane, and variable external magnetic damping means for the said mass.

7. A vibration-detecting instrument for detecting vibrations, consisting of a thermionic vacuum tube comprising a casing, an enclosed element fixed relatively to the casing, a damping magnet mounted with its poles embracing a part of the vacuum tube, and a relatively movable element comprising a flexible portion which permits movement only in a single plane and a copper portion located between the poles of the said magnet.

8. A vibration-detecting instrument for detecting vibrations, consisting of a thermionic vacuum tube comprising a casing, enclosed elements fixed relatively to the casing, a damping electro-magnet mounted with its poles embracing a part of the vacuum tube, and a relatively movable element comprising a flexible portion anchored in the tube to permit movement of such element only in a single plane, and a weighted end portion of copper located between the poles of the said electromagnet.

In testimony whereof I have signed my name to this specification.

OLIVE SCOTT PETTY.